US007641261B2

(12) United States Patent
Rusnak

(10) Patent No.: US 7,641,261 B2
(45) Date of Patent: Jan. 5, 2010

(54) EXTENDED TRAVEL SLIDING DOOR MECHANISM

(75) Inventor: Stephen D. Rusnak, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 73 days.

(21) Appl. No.: 12/045,720

(22) Filed: Mar. 11, 2008

(65) Prior Publication Data

US 2009/0230721 A1 Sep. 17, 2009

(51) Int. Cl.
*B60J 5/06* (2006.01)

(52) U.S. Cl. ........................................ 296/155; 49/449

(58) Field of Classification Search ................ 296/155; 49/404, 449

See application file for complete search history.

(56) References Cited

U.S. PATENT DOCUMENTS 4,152,872 A * 5/1979 Tanizaki et al. ............... 49/214
4,502,246 A * 3/1985 Minami ....................... 49/322
5,361,540 A * 11/1994 Rogers et al. ................. 49/449
5,481,830 A * 1/1996 Gooding et al. ............... 49/449
6,036,257 A 3/2000 Manuel

FOREIGN PATENT DOCUMENTS

JP 63214463 * 3/1990

* cited by examiner

*Primary Examiner*—Dennis H Pedder

(57) ABSTRACT

A sliding door moves between a closed position and an open position over a vehicle opening. A track is mounted along the vehicle and extends to a remote end. The length of the track is less than the distance traveled by the sliding door. A door bracket mounted to the sliding door has a slot extending parallel to the track with first and second ends. A roller bracket has rollers received by the track and is movable between a first position proximate the opening and a second position at the remote end of the track. The roller bracket includes a pin slidably received in the slot to shift between the first and second ends of the slot. The pin is pivotally retained at the first end of the slot when the sliding door is closed. The pin is retained at the second end when the sliding door is open.

18 Claims, 5 Drawing Sheets

EXTENDED TRAVEL SLIDING DOOR MECHANISM

BACKGROUND OF INVENTION

The present invention relates generally to vehicular sliding doors in which the rearward side of the sliding door is supported by a roller bracket that traverses a roller track mounted along the exterior side of the vehicle.

A typical sliding door for a passenger vehicle such as a van, minivan, or a crossover vehicle is supported by and guided by upper and lower track assemblies at the front edge of the sliding door and a center track assembly attached to the rear edge of the door. The size of the door opening that may be uncovered when the sliding door opens is limited to the available distance of rearward travel for the door. A large door opening is desired for ease of ingress/egress and for maximizing the size of loads that may pass through the door opening. However, door travel is typically limited by the length of the tracks in which the roller assemblies traverse during opening of the sliding door. The center track, which receives a roller bracket mounted to the rearward edge of the sliding door, cannot extend beyond the back edge of the vehicle body. The presence of rear taillight assemblies may further limit the available space for the center track. In addition, it is desired to minimize the length of the track to reduce its visibility for aesthetic purposes. Reducing the length of the track also creates opportunities to reduce vehicle weight.

SUMMARY OF INVENTION

The present invention modifies the door bracket of the prior art to include a slot for slidably receiving the pivot pin of the roller bracket in a manner that provides an advantageous extension of door travel without corresponding travel of the roller bracket.

In one aspect of the invention, an apparatus is provided for supporting a sliding door that moves between a closed position and a fully open position to selectively cover an opening in a vehicle. A track is mounted along an exterior side of the vehicle and extends away from the opening to a remote end. The length of the track from the opening to the remote end is less than the distance traveled by the sliding door between the closed position and the fully open position. A door bracket fixedly mounted to the sliding door has a slot extending substantially parallel to the track with first and second ends. A roller bracket has rollers received by the track and is movable between a first position proximate the opening and a second position at the remote end of the track. The roller bracket includes a pin slidably received in the slot to shift between the first and second ends of the slot. The pin is pivotally retained at the first end of the slot when the sliding door is at or moving out of or into its closed position. The pin is retained at the second end of the slot when the sliding door is in its fully open position.

DETAILED DESCRIPTION

Figure 1:
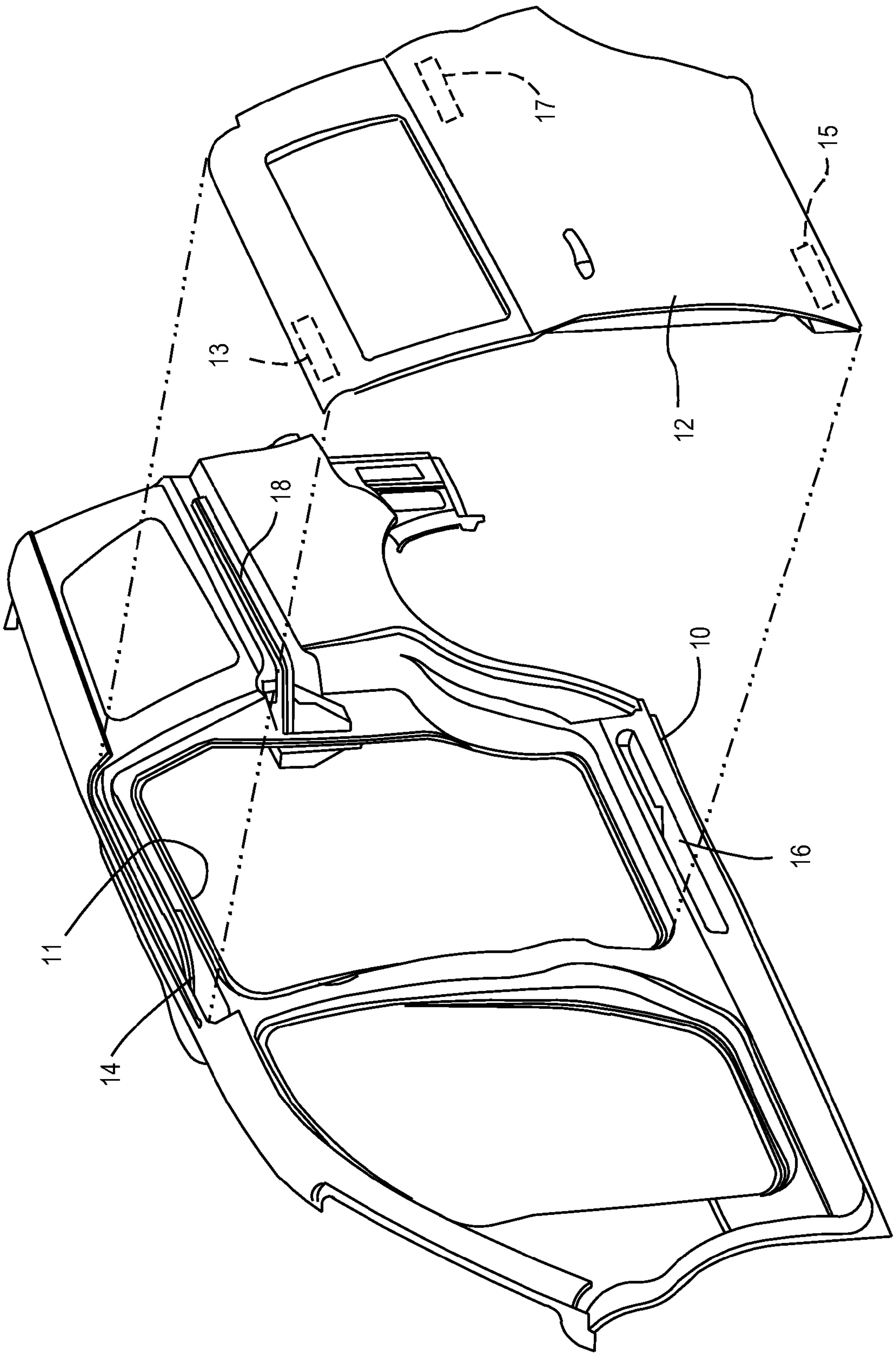
FIG. 1 is an exploded perspective view showing a door and body member.

Referring to FIG. 1, a body member 10 has a door opening 11 for receiving a sliding door 12. A pair of door brackets 13 and 15 are mounted at the forward edge of door 12 and receive roller brackets (not shown) that slide in upper and lower roller tracks 14 and 16, respectively. A door bracket 17 mounted toward the rearward edge of door 12 connects to a roller bracket (not shown) that slides in a center roller track 18.

Figure 2:
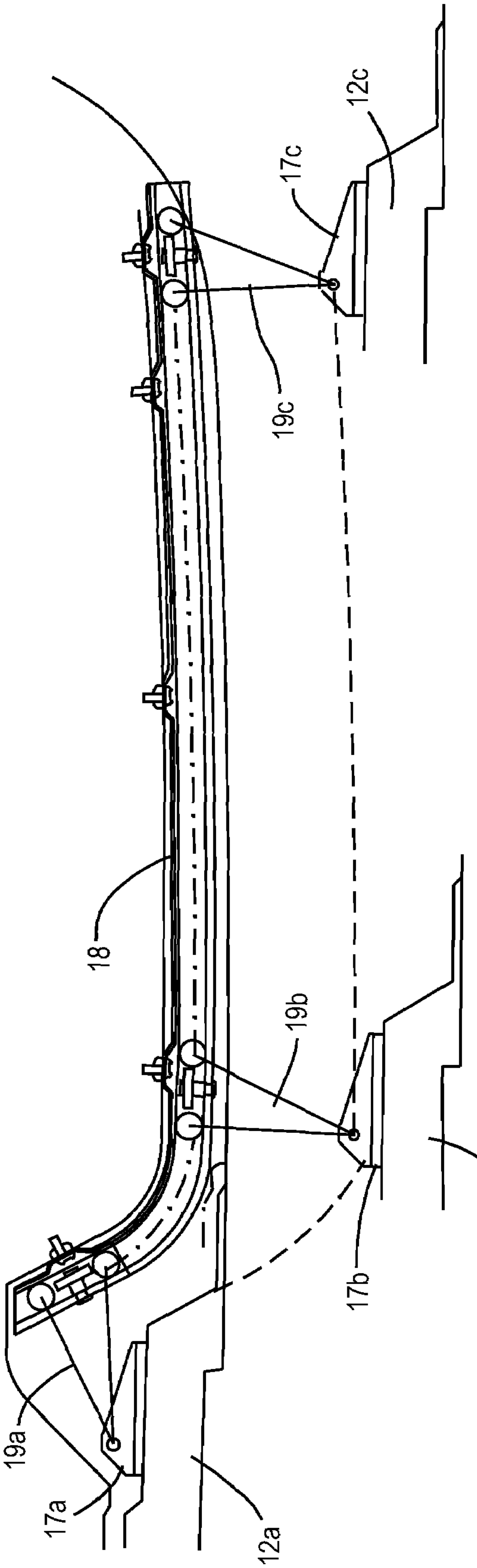
(Prior Art) FIG. 2
FIG. 2 is a top view showing a conventional sliding door mechanism in different positions.

FIG. 2 shows a prior art arrangement for the opening of a sliding door 12 having a door bracket 17 hingedly connected to a roller bracket 19 that slides within track 18. The door is closed at a position 12A when bracket 17A and roller bracket 19A are in the positions shown. As the door is opened and initially moves outward along the curved end of track 18, the end of roller bracket 19 pivots around door bracket 17 until it reaches the position shown as 12B. The fully open position of the door at 12C corresponds to roller bracket being at the end of track at position 19C. Using the prior art arrangement as shown, the range of rearward movement of the door corresponds to the length of track 18. In order to increase door travel to provide a larger door opening for ingress/egress through a larger door opening, the prior art required a lengthening of track 18. However, a longer track is undesirable.

Figure 3:
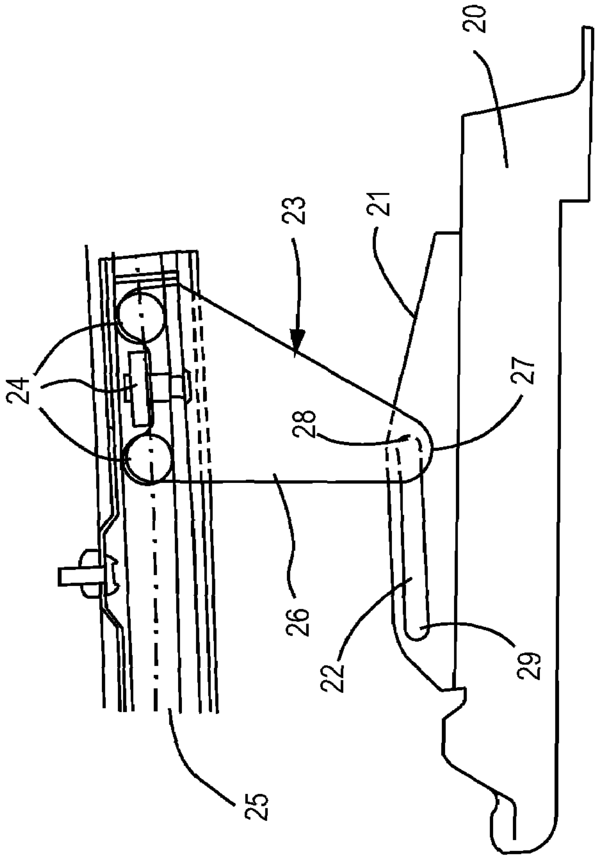
FIG. 3 is a top diagrammatic view showing a slotted door bracket of the present invention.
Figure 4:
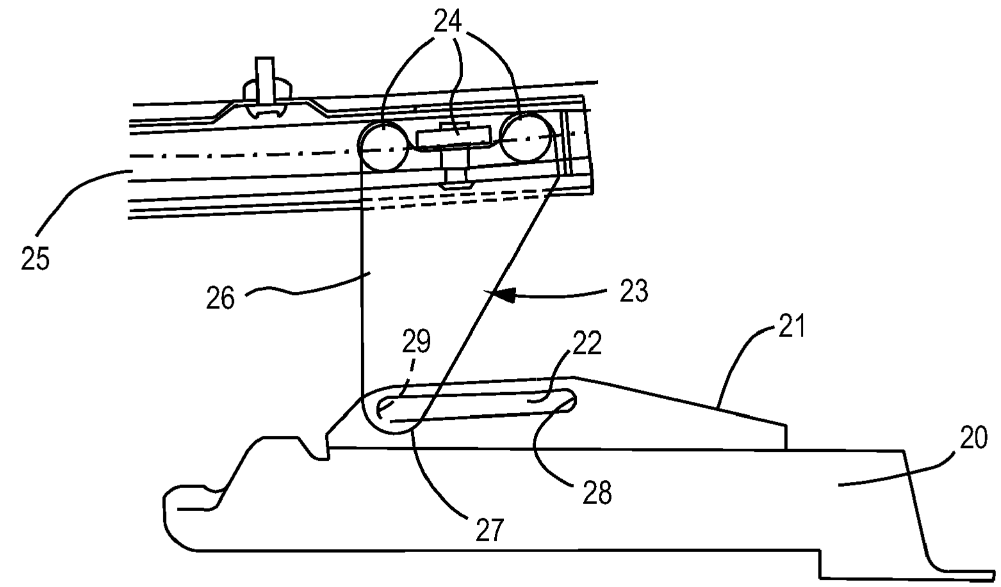
FIG. 4 is a top view of the door bracket in FIG. 3 shown at an extended position in the slot.

FIG. 3 shows a first embodiment of the present invention for increasing door travel without increasing the length of the track. A door 20 has a door bracket 21 mounted to its inside. Instead of the conventional hole for receiving a hinge pin of the roller bracket, the invention employs a slot 22 extending substantially parallel to a roller track 25. A roller bracket 23 includes rollers 24 slideably received in track 25 in the conventional manner. A plate 26 extends from rollers 24 to a hinge section 27 which is captured in slot 22. In the normal opening position shown in FIG. 3, hinge portion 27 is located at a first end 28 of slot 22 resulting in initial door movement identical to that provided by the prior art system shown in FIG. 2. When roller bracket 23 reaches the remote end of track 25, hinge portion 27 is allowed to slide in slot 22 to a second end 29 as shown in FIG. 4. Thus, door 20 achieves an additional rearward movement approximately equal to the length of slot 22. As a result, the length of center track 25 can be reduced by an equal amount versus the prior art while still providing an equivalent amount of door travel. Although space and appearance are less of a concern for the upper and lower tracks which are not visible when the door is closed, slots can also be used in the upper and lower door brackets, if desired.

The hinge pin of the roller bracket is pivotally retained at first end 28 of slot 22 when the sliding door is at or moving out of or into its closed position. When the door is opened and the roller bracket is in the straight section of the track, it is no longer necessary for the hinge pin to pivot within the slot. The hinge pin is retained at the second end of the slot when the sliding door is in its fully open position. Sliding movement of the hinge pin within the slot may preferably be restricted to occur only when the roller bracket is at the end of the track as will be described below. However, sliding can alternatively occur at any location(s) along the travel path of the roller bracket according to the door operation desired.

Figure 5:
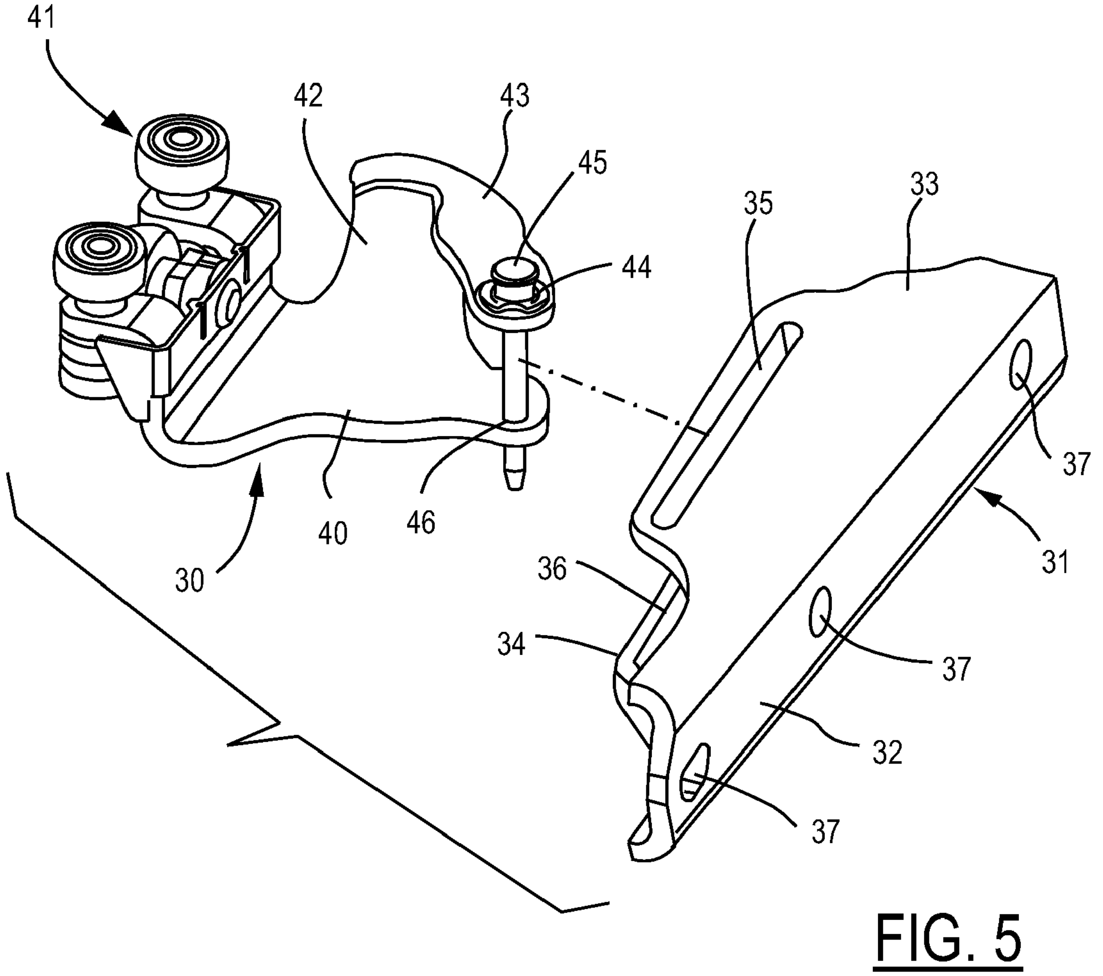
FIG. 5 is a perspective view showing a roller bracket and a door bracket according to another embodiment of the invention.

FIG. 5 shows an embodiment of the present invention in greater detail wherein a roller bracket 30 attaches to a door bracket 31. Door bracket 31 comprises a U-channel having a base plate 32 and first and second side flanges 33 and 34. A first slot section 35 is provided in first side flange 33 and a second slot section 36 is provided in second side flange 34. Slot sections 35 and 36 are parallel and are equal in width and length. Base plate 32 includes mounting holes 37.

Figure 6:
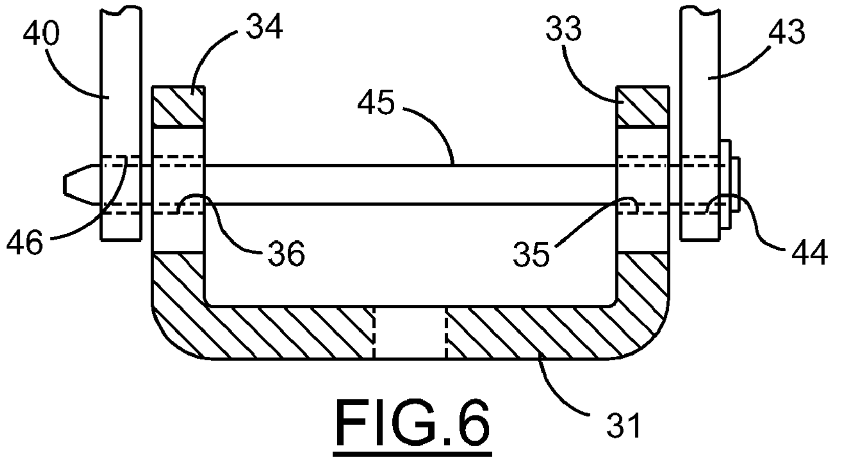
FIG. 6 is a side, longitudinal view showing the door bracket joined to the roller bracket of FIG. 5.

Roller bracket 30 includes a plate 40 having a roller assembly 41 to be received in a track. Plate 40 has a side extension leading to an extension plate 43 with a pivot hole 44 for receiving a hinge pin 45. Plate 40 has a second pivot hole 46 coaxial with hole 44 for likewise receiving hinge pin 45. The distance between holes 44 and 46 is greater than the outside spacing of side flanges 33 and 34. Thus, roller bracket 30 and door bracket 31 are joined as a hinge as shown in FIG. 6. Slots 35 and 36 are in alignment so that hinge pin 45 smoothly traverses the slots.

In order to enhance smooth operation, it may be desirable to lock the roller bracket pin at the slot ends during different times of door travel. For example, it may be desirable to lock the hinge pin at the first end of the slot (to function like the hole of the prior art) except when the roller bracket has reached the open end of the track and the desired additional door travel is needed. The hinge pin is then released from the first end and allowed to slide to the second end of the slot where it is again locked in order to positively maintain the fully open door position. Locking of the pin at the slot ends can be achieved by various mechanisms including a spring loaded lever, a frictional surface, or other latch mechanisms.

Figure 7:
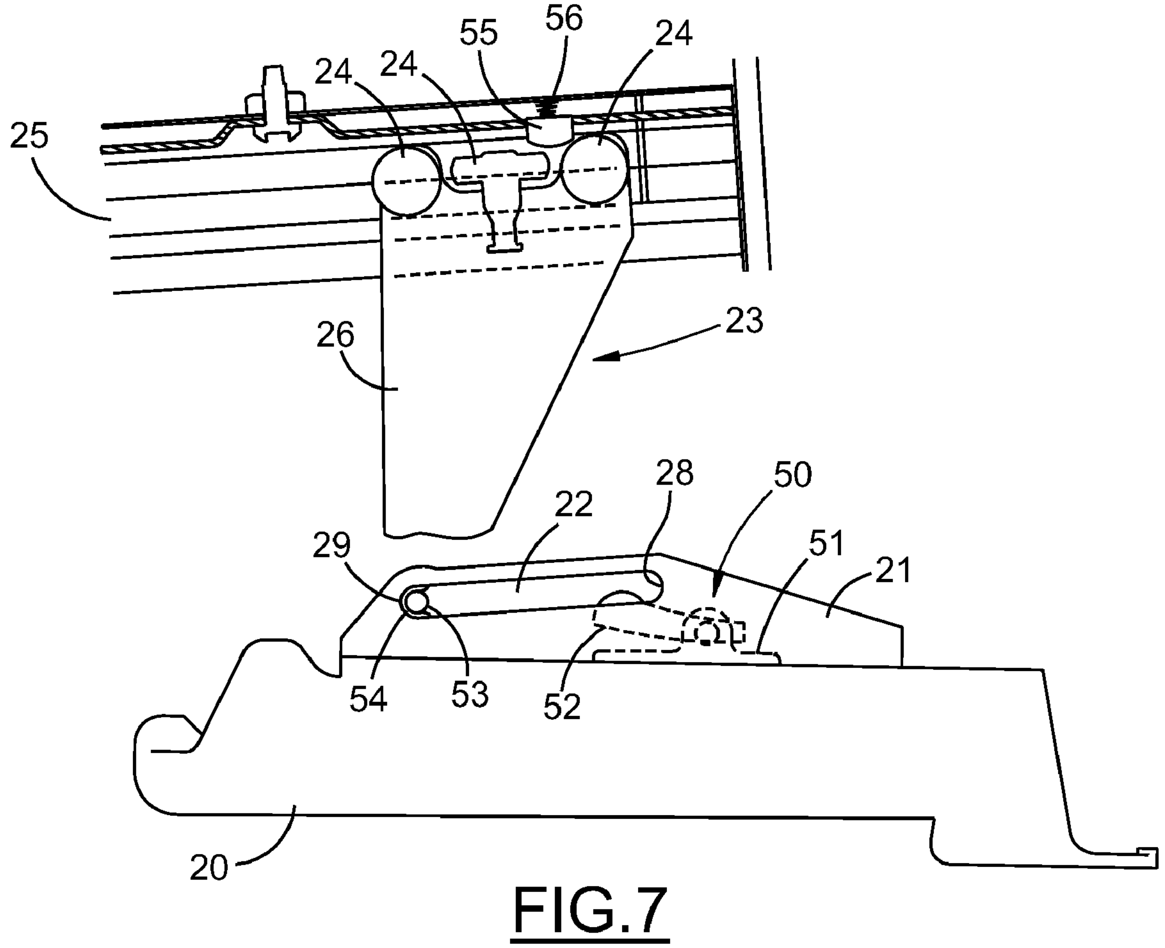
FIG. 7 is a top, diagrammatic view of an alternative embodiment including various lock mechanisms.

One preferred set of locks is shown in FIG. 7. Door 20 is shown at its fully open position wherein hinge pin 53 of roller bracket 23 is located at second end 29 of slot 22. When hinge pin 53 is at first end 28 of slot 22 it is retained by a latch mechanism 50 having a base plate 51 and a spring-loaded lever 52 having a normal, extended position which enters the slot space adjacent to first end 28. Lever 52 is compressible in a downward direction against a spring (not shown) to allow hinge pin 53 to move into and out of first end 28. Upward force of lever 52 created by the spring is sufficient to prevent lever 52 from being retracted by the force of pin 53 while the door is sliding open. Once roller bracket 23 reaches the end of track 25, it stops rolling and then hinge pin 53 provides sufficient force against lever 52 to overcome the spring and to allow hinge pin 53 to move leftward in slot 22. A frictional surface such as a cup 54 is provided at second end 29 for receiving hinge pin 53 with an interference fit. The opening force applied to door 20 forces hinge pin 53 into friction cup 54 to provide positive retention of the door at the fully open position. Friction cup 54 preferably comprises a resilient material with a size and shape designed such that an appropriately small retention force can be easily overcome when the user pulls on the door to begin closing the door. A typical sliding door system may include a “hold open” mechanism comprising a latch in the lower door bracket that is released by activating the door handle. In such a system, friction cup 54 functions to prevent rattle of pin 53 in slot 22, and supplement the hold-open function of the lower door bracket.

When initiating the closing operation, it is desired that roller bracket 23 remain at the end of the track until hinge pin 53 is returned to first end 28. Thus, a plunger 55 is biased by a spring 56 to protrude into the roller area in track 25. Plunger 55 only needs to provide sufficient resistance against movement of bracket 23 to overcome the retention force of hinge pin 53 in friction cup 54 and to provide the force necessary to deflect lever 52 when hinge pin 53 reenters first end 28. Thus, lever 52 preferably has differently sloped surfaces configured to require less force to deflect it when hinge pin 53 is moving into first end 28 than when it is moving out of first end 28. Likewise, plunger 55 can include differently sloped surfaces that provide less resistance against roller 24 when moving toward the end of track 25 than when moving out of that position.

Figure 8:
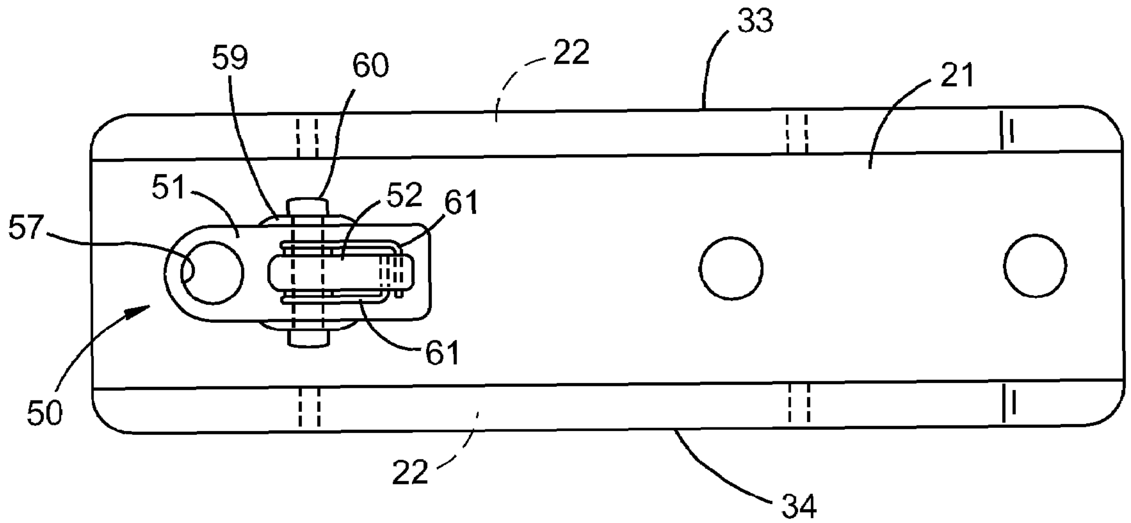
FIG. 8 is a front plan view of the door bracket of FIG. 7.

FIG. 8 shows a top view of latch 50 wherein base plate 51 may be retained on door bracket 21 by welding, for example. In addition, a hole 57 may be provided in alignment with one of the mounting holes for bracket 21. Base plate 51 has upstanding flanges 58 and 59 with coaxial holes for receiving a hinge pin 60. Lever 52 is mounted on pin 60 and is urged into an upward position by a spring 61 mounted to pin 60.

Figure 9:
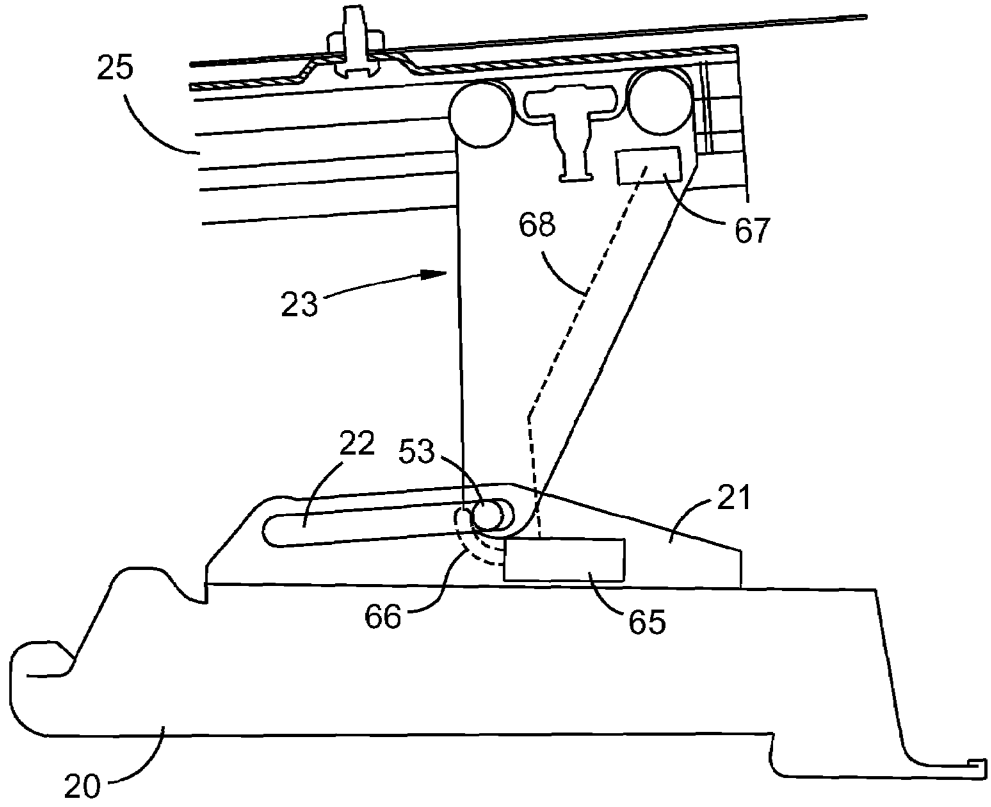
FIG. 9 is a top, diagrammatic view showing an alternative embodiment for locking the roller bracket and door bracket at various positions.

An alternative embodiment of the locks is shown in FIG. 9. A latch 65 on door bracket 21 includes a lever arm 66 for capturing hinge pin 53 at the first end of slot 22. Roller bracket 23 includes a latch 67 that engages when roller bracket 23 reaches the end of track 25. In the act of latching, latch 67 simultaneously activates an interlock 68 that is linked to latch 65 causing it to retract lever 66, thereby releasing hinge pin 53 and allowing it to travel to the second end of slot 22 so that door 20 reaches its fully open position. During the door closing operation, when hinge pin 53 reenters the first end of slot 22 it re-activates interlock 68 so that lever 66 is restored to its normal position and latch 67 is released to allow roller bracket 25 to roll away from the end of track 25. Interlock 68 may preferably be a rocker arm for selectably controlling spring loaded levers as is known in the art.

In view of the foregoing, the present invention has provided a method for extending travel of a vehicle sliding door beyond the end of a roller track traversed by a roller bracket that supports the door during opening. A slot is provided in the door bracket and extends substantially parallel with the roller track between its first and second ends. The roller bracket is connected with the door bracket via a pin passing through the slot. The pin is pivotally retained at the first end of the slot when the sliding door is at or moving out of or into its closed position. The pin is released from the first end of the slot to allow extended travel of the sliding door. The pin is retained at the second end of the slot when the sliding door is in its fully opened position. As a result, the rearward travel of the door is no longer limited to the track length and a greater door opening can be provided without affecting vehicle styling or vehicle cost and weight.

While certain embodiments of the present invention have been described in detail, those familiar with the art to which this invention relates will recognize various alternative designs and embodiments for practicing the invention as defined by the following claims.

What is claimed is:

1. An apparatus for supporting a sliding door that moves between a closed position and a fully open position to selectively cover an opening in a vehicle, comprising:

a track mounted along an exterior side of the vehicle and extending away from the opening to a remote end, the length of the track from the opening to the remote end being less than the distance traveled by the sliding door between the closed position and the fully open position;

a door bracket for fixedly mounting to the sliding door, the door bracket having a slot extending substantially parallel to the track and having first and second ends; and a roller bracket having rollers received by the track and movable between a first position proximate the opening and a second position at the remote end of the track, wherein the roller bracket includes a pin slidably received in the slot to shift between the first and second ends of the slot; and wherein the door bracket includes a first retainer configured to pivotally retain the pin at the first end of the slot when the sliding door is at or moving out of or into its closed position, and a second retainer configured to retain the pin at the second end of the slot when the sliding door is in its fully open position.

2. The apparatus of claim 1 wherein the door bracket comprises a U-channel with first and second side flanges, wherein the slot comprises first and second parallel sections in the first and second side flanges, respectively, and wherein the pin passes through the first and second parallel sections substantially perpendicularly.

3. The apparatus of claim 1 wherein the first retainer comprises a first lock configured to engage the pin at the first end when the sliding door is in a normal travel range including the closed position and to release the pin when the sliding door is in an extended travel range including the fully open position.

4. The apparatus of claim 3 wherein the first lock comprises a spring-loaded lever.

5. The apparatus of claim 4 wherein the roller bracket includes an interlock for releasing the spring-loaded lever when the roller bracket is at its second position at the remote end of the track.

6. The apparatus of claim 5 wherein the interlock maintains the roller bracket at its second position until the interlock is reset by action of the pin when the sliding door is being closed.

7. The apparatus of claim 3 wherein the first lock comprises a frictional surface.

8. The apparatus of claim 1 wherein the second retainer comprises a second lock configured to engage the pin at the second end when the sliding door is in an extended travel range including the fully open position and to release the pin when the sliding door is in a normal travel range including the closed position.

9. The apparatus of claim 8 wherein the second lock comprises a frictional surface.

10. The apparatus of claim 8 wherein the second lock comprises a friction cup mounted in the slot at the second end of the slot.

11. A sliding door apparatus for a vehicle having a door opening, comprising:

a sliding door selectively covering the door opening by moving between a closed position and a fully open position, the sliding door having a front edge and a back edge;

a track mounted along an exterior side of the vehicle and extending away from the opening to a remote end, the length of the track from the opening to the remote end being less than the distance traveled by the sliding door between the closed position and the fully open position;

a door bracket fixedly mounted to the sliding door at the back edge, the door bracket having a slot extending substantially parallel to the track and having first and second ends; and a roller bracket having rollers received by the track and movable between a first position proximate the opening and a second position at the remote end of the track, wherein the roller bracket includes a pin slidably received in the slot to shift between the first and second ends of the slot; and wherein the door bracket includes a first retainer configured to pivotally retain the pin at the first end of the slot when the sliding door is at or moving out of or into its closed position, and a second retainer configured to retain the pin at the second end of the slot when the sliding door is in its fully open position.

12. The sliding door apparatus of claim 11 wherein the door bracket comprises a U-channel with first and second side flanges, wherein the slot comprises first and second parallel sections in the first and second side flanges, respectively, and wherein the pin passes through the first and second parallel sections substantially perpendicularly.

13. The sliding door apparatus of claim 11 wherein the first retainer comprises a first lock configured to engage the pin at the first end when the sliding door is in a normal travel range including the closed position and to release the pin when the sliding door is in an extended travel range including the fully open position.

14. The sliding door apparatus of claim 13 wherein the first lock comprises a spring-loaded lever.

15. The sliding door apparatus of claim 14 wherein the roller bracket includes an interlock for releasing the spring-loaded lever when the roller bracket is at its second position at the remote end of the track.

16. The sliding door apparatus of claim 15 wherein the interlock maintains the roller bracket at its second position until the interlock is reset by action of the pin when the sliding door is being closed.

17. The sliding door apparatus of claim 13 wherein the second retainer comprises a second lock configured to engage the pin at the second end when the sliding door is in an extended travel range including the fully open position and to release the pin when the sliding door is in a normal travel range including the closed position.

18. The sliding door apparatus of claim 17 wherein the second lock comprises a frictional surface.

* * * * *